(12) United States Patent
Kühne

(10) Patent No.: US 10,304,245 B2
(45) Date of Patent: May 28, 2019

(54) METHOD FOR OPERATING A VIRTUAL REALITY SYSTEM, AND VIRTUAL REALITY SYSTEM

(71) Applicant: AUDI AG, Ingolstadt (DE)

(72) Inventor: Marcus Kühne, Beilngries (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/778,497

(22) PCT Filed: Nov. 17, 2016

(86) PCT No.: PCT/EP2016/077971
§ 371 (c)(1),
(2) Date: May 23, 2018

(87) PCT Pub. No.: WO2017/108287
PCT Pub. Date: Jun. 29, 2017

(65) Prior Publication Data
US 2018/0350143 A1 Dec. 6, 2018

(30) Foreign Application Priority Data
Dec. 22, 2015 (DE) .................. 10 2015 226 585

(51) Int. Cl.
*G06T 19/00* (2011.01)
*G06F 3/01* (2006.01)
*G09G 5/37* (2006.01)

(52) U.S. Cl.
CPC ............ *G06T 19/003* (2013.01); *G06F 3/011* (2013.01); *G06F 3/012* (2013.01); *G09G 5/37* (2013.01); *G09G 2354/00* (2013.01)

(58) Field of Classification Search
CPC ......... G06T 19/003; G06F 3/012; G09G 5/37; G09G 2354/00
See application file for complete search history.

(56) References Cited

U.S. PATENT DOCUMENTS

| 6,714,213 B1 | 3/2004 | Lithicum et al. |
| 2002/0190989 A1 | 12/2002 | Kamata et al. |
| (Continued) | | |

FOREIGN PATENT DOCUMENTS

| CN | 103064188 | 4/2013 |
| DE | 10 2014 009 701 A1 | 12/2015 |
| (Continued) | | |

OTHER PUBLICATIONS

German Office Action dated Oct. 6, 2016 from German Patent Application No. 10 2015 226 585.4, 10 pages.
(Continued)

*Primary Examiner* — Chong Wu
(74) *Attorney, Agent, or Firm* — Staas & Halsey LLP

(57) ABSTRACT

A position of virtual reality glasses is detected using a detection device, a virtual observation position is predefined depending on the detected position of the virtual reality glasses, and a virtual bounding volume which surrounds the virtual observation position at least partially is predefined, a virtual object arranged in a virtual environment is displayed from the virtual observation position using the virtual reality glasses. As long as a part of the virtual object is immersed in the virtual bounding volume, this part is displayed as being at least partially transparent.

12 Claims, 2 Drawing Sheets

(56) References Cited

U.S. PATENT DOCUMENTS

| | | | |
|---|---|---|---|
| 2005/0024388 A1 | 2/2005 | Takemoto | |
| 2008/0043022 A1 | 2/2008 | Ishihara | |
| 2014/0132484 A1 | 5/2014 | Pandey et al. | |
| 2016/0025982 A1* | 1/2016 | Sutherland | G02B 27/0172 359/13 |
| 2016/0155267 A1* | 6/2016 | Bean | G02B 27/01 345/633 |

FOREIGN PATENT DOCUMENTS

| | | |
|---|---|---|
| DE | 10 2015 226 585.4 | 12/2015 |
| WO | PCT/EP2016/077971 | 11/2016 |

OTHER PUBLICATIONS

International Search Report dated Jan. 19, 2017 from International Patent Application No. PCT/EP2016/077971, 3 pages.
Anonymous: "How to make the MainCamera 'far clipping plane' a Sphere—Unite Answers", Retrieved from the Internet: URL:http://answers.unity3d.com/questions/629779/how-to-make-the-maincamera-far-clipping-plane-a-sp.html, retrieved on Jan. 11, 2017, 2 pages.
Elmqvist et al., "Dynamic Transparency for 3D Visualization" design and Evaluation, The international Journal of Virtual Reality, 2009, 8(X): Y-Z, pp. 1-14.
Translation of International Preliminary Report on Patentability dated Jun. 28, 2018 from International Patent Application No. PCT/EP2016/077971, 9 pages.
Chinese Office Action dated Feb. 28, 2019, from Chinese Patent Application No. 201680050862.2, with English language translation of summary of Examiner's comments (6 pp. total) Partial.

\* cited by examiner

METHOD FOR OPERATING A VIRTUAL REALITY SYSTEM, AND VIRTUAL REALITY SYSTEM

CROSS REFERENCE TO RELATED APPLICATIONS

This application is a U.S. national stage of International Application No. PCT/EP2016/077971, filed on Nov. 17, 2016. The International Application claims the priority benefit of German Application 10 2015 226 585.4 filed on Dec. 22, 2015. Both the International Application and the German Application are incorporated by reference herein in their entirety.

BACKGROUND

Described herein is a method for operating a virtual reality system, and a virtual reality system.

A virtual reality can be represented through a virtual reality system, wherein the term virtual reality usually denotes the representation and simultaneous perception of reality in terms of the physical properties thereof in an interactive virtual environment that is computer-generated in real time.

Virtual reality systems may include virtual reality glasses for displaying a virtual environment. Virtual reality glasses are a specific form of a so-called head-mounted display, which is a visual output unit worn on the head. It presents images on a screen near the eyes or projects them directly onto the retina. In this case, virtual reality glasses additionally also have sensors for detecting movements of the head. The display of calculated graphics can thus be adapted to the movements of a wearer of the virtual reality glasses. As a result of the physical proximity, the displayed image surfaces of head-mounted displays appear considerably larger than free-standing screens and in the extreme case even cover the entire field of view of the user. Since respective displays of virtual reality glasses follow all head movements of a wearer as a result of the head posture, the wearer is given the sense of moving directly in a computer-generated image landscape.

A person who has put on virtual reality glasses can usually move in a specific detection region within which reliable position detection for the virtual reality glasses and thus also for the person is possible. Consequently, movements of the person can be converted into corresponding virtual movements within a virtual environment displayed by using the virtual reality glasses. By way of example, a virtual object displayed within the virtual environment, for example a virtual motor vehicle, can thereby be examined from various virtual observation positions.

In this case, in the event of a corresponding movement of the person who has put on the virtual reality glasses, it can happen that the person moves through the displayed virtual object within the virtual environment. This can engender an unpleasant feeling for the person since the person moves through simulated solid matter, for example through a virtual vehicle door. This conflicts with the customarily learnt human behavior of avoiding collisions with objects. Although the collision does not occur in reality, consciousness perceives that something is not right, as a result of which, in the best case, just the immersion is disturbed or, in the worse case, the person is made to feel unwell or nauseous.

SUMMARY

Therefore, the problem addressed by the method for operating a virtual reality system and the virtual reality system is to avoid virtual collisions with virtual objects displayed in a virtual environment.

In the method for operating a virtual reality system, a position of virtual reality glasses is detected by using a detection device. In addition, a virtual observation position is predefined depending on the detected position of the virtual reality glasses. Furthermore, a virtual bounding volume is predefined, which at least partly surrounds the virtual observation position. A virtual object arranged in a virtual environment is displayed from the predefined virtual observation position, wherein as long as a part of the virtual object is immersed in the virtual bounding volume, the part is displayed in at least a partly transparent fashion.

Depending on the continuously detected position of the virtual reality glasses, therefore, the virtual observation position is predefined, from which the virtual object arranged in the virtual environment is displayed by using the virtual reality glasses. From the detected position of the virtual reality glasses, it is possible to deduce a corresponding position of a person who has put on the virtual reality glasses. For example, an eye position of the wearer of the virtual reality glasses is determined on the basis of the detected position of the virtual reality glasses. The virtual observation position is predefined in a manner corresponding to the determined eye position of the wearer of the virtual reality glasses. In other words, the virtual observation position thus corresponds to a virtual eye position from which the virtual environment together with the virtual object arranged therein is displayed to the wearer of the virtual reality glasses. In this case, the bounding volume at least partly surrounds the virtual observation position, which can also be implemented for example such that the virtual bounding volume at least partly surrounds a virtual head of the wearer of the virtual reality glasses within the virtual environment.

If the wearer of the virtual reality glasses moves in reality, then the wearer automatically also moves correspondingly in the virtual environment displayed by using the virtual reality glasses. In order to prevent the wearer of the virtual reality glasses from colliding with the displayed virtual object within the displayed virtual environment or from even moving through the virtual object, the method provides for that part of the virtual object which is immersed in the virtual bounding volume to be displayed in at least a partly transparent fashion. As a result of the at least partly transparent display of the part of the virtual object which is immersed in the virtual bounding volume, the wearer of the virtual reality glasses is made aware in good time that he/she is just about to virtually collide with the virtual object within the virtual environment or even move through the virtual object. Since that part of the virtual object which is immersed in the virtual bounding volume is not immediately masked out completely in this case, the relation of the part to the entire virtual object is not lost. As a result, that part of the virtual object which is immersed in the bounding volume is also perceived as being associated with the rest of the virtual object.

By the method described herein, therefore, firstly, the wearer of the virtual reality glasses can be warned in good time if he/she is about to collide with the displayed virtual object or even pass through the latter. Secondly, the perception—as realistically as possible—of the virtual environment and of the virtual object arranged therein is adversely affected only very little for the wearer of the virtual reality glasses.

One advantageous embodiment provides for the virtual bounding volume to be predefined in a spherical fashion, wherein the midpoint of the bounding volume is arranged at the virtual observation position. However, the virtual bounding volume can also have some other spherical shape, for example. For example, the virtual bounding volume thus completely surrounds the virtual observation position, which, as stated, represents a kind of virtual eye position of the wearer of the virtual reality glasses. Within the displayed virtual environment, therefore, as it were the virtual head of the wearer of the virtual reality glasses is surrounded by the virtual bounding volume in a spherical fashion. In the event of pivoting of the virtual reality glasses, the virtual viewing direction within the virtual environment is also pivoted automatically, such that the visual perspective on the displayed virtual object changes. Primarily if the virtual bounding volume is predefined in a spherical fashion and the midpoint of the bounding volume is arranged at the virtual observation position, the wearer of the virtual reality glasses, even in the event of fast pivoting movements of the virtual reality glasses in all possible directions, can be made aware in a timely manner if he/she is just about to collide with the virtual object within the virtual environment or pass through the latter.

A further advantageous embodiment provides for the entire part of the object to be displayed all the more transparently the further it is immersed in the bounding volume. As a result, the wearer of the virtual reality glasses recognizes in a particularly simple manner the extent to which he/she has approached the virtual object within the virtual environment, even before he/she touches or collides with the virtual object. This is because the wearer of the virtual reality glasses will endeavor to have the entire virtual object displayed as much as possible in a non-transparent fashion, and so the wearer will automatically increase his/her virtual distance from the virtual object.

In accordance with an alternative advantageous embodiment, provision is made for the transparency of the part of the virtual object to be displayed in a manner increasing to an ever greater extent from a region intersecting a boundary of the bounding volume to a region immersed the most deeply in the bounding volume. In other words, the degree of transparency thus increases to an ever greater extent from the region intersecting the boundary of the bounding volume to the region immersed the most deeply in the bounding volume. The transparency can increase for example linearly with the immersion depth in the bounding volume. As a result, the wearer of the virtual reality glasses can recognize in a particularly simple manner the region of the virtual object with which he/she will most likely collide, and so the wearer can correspondingly adapt his/her real movement in order to change his/her virtual distance from the displayed virtual object in such a way that he/she will not collide with or pass through any part of the virtual object.

In accordance with a further advantageous embodiment, it is provided that as soon as the part of the virtual object exceeds a predefined immersion depth in the bounding volume, a component or an assembly to which the part of the virtual object belongs is completely masked out. As a result, a particularly good warning function is provided for the wearer of the virtual reality glasses, since, in the event of approaching the virtual object too closely, as a result of the masking out of the corresponding component or assembly to which the part of the virtual object belongs, the wearer is unmistakably made aware that he/she is just about to collide with the virtual object. In addition, if the person nevertheless continues to approach the part of the virtual object, the person is thereby prevented from being able to collide with the part of the virtual object. Moreover, since an entire component or an entire assembly is masked out, a relatively realistic representation of the displayed virtual object furthermore results.

A further advantageous configuration provides for a virtual motor vehicle to be displayed as the virtual object. In this context, it is provided that if the virtual motor vehicle is displayed in an interior view, the bounding volume is predefined to be smaller than if the virtual motor vehicle is displayed in an exterior view. For if the wearer of the virtual reality glasses views the virtual cockpit of the virtual motor vehicle, for example, then even relatively small movements of the wearer of the virtual reality glasses can result in the wearer being immersed in corresponding virtual components of the cockpit of the motor vehicle. By contrast, if the virtual motor vehicle is displayed in a virtual exterior view, then the risk of the wearer of the virtual reality glasses being virtually immersed in components of the virtual motor vehicle is significantly lower. The adaptation of the size of the bounding volume depending on whether the virtual motor vehicle is displayed from the interior or from the exterior makes it possible to ensure that, firstly, the wearer of the virtual reality glasses is given a timely enough warning that he/she is about to collide with the displayed virtual motor vehicle, but secondly, this also makes it possible to ensure that the realistic representation of the virtual motor vehicle is not restricted to an excessively great extent by parts of the virtual motor vehicle being displayed in a partly transparent fashion or being masked out too early. In the case of a spherical bounding volume, for example, the radius of the bounding volume can be predefined to be smaller in the case of an interior view compared with an exterior view of the virtual motor vehicle. For other shapings of the bounding volume, the latter is analogously predefined to be correspondingly smaller or larger.

The virtual reality system described herein includes virtual reality glasses and a detection device designed to detect a position of the virtual reality glasses. Furthermore, the virtual reality system includes a control device designed to predefine a virtual observation position depending on the detected position of the virtual reality glasses. Furthermore, the control device is designed to predefine a virtual bounding volume, which at least partly surrounds the virtual observation position. Finally, the control device is also designed to drive the virtual reality glasses in such a way that, by use of the latter, a virtual object arranged in a virtual environment is displayed from the virtual observation position and as long as a part of the virtual object is immersed in the virtual bounding volume, then the part is displayed in an at least partly transparent fashion. In this case, advantageous configurations of the method described herein should be regarded as advantageous configurations of the virtual reality system described herein, wherein the virtual reality system includes features for carrying out the method.

Further advantages, features and details of the method for operating the virtual system and the virtual system described herein are evident from the following description and example embodiments, with reference to the drawings. The features and feature combinations mentioned above in the description and the features and feature combinations mentioned below in the description of the drawings and/or shown solely in the drawings can be used not only in the combination respectively indicated, but also in other combinations or by themselves, without departing from the scope of the disclosure.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Reference will now be made in detail to example embodiments which are illustrated in the accompanying drawings, wherein identical or functionally identical elements are provided with identical reference signs.

Figure 1:
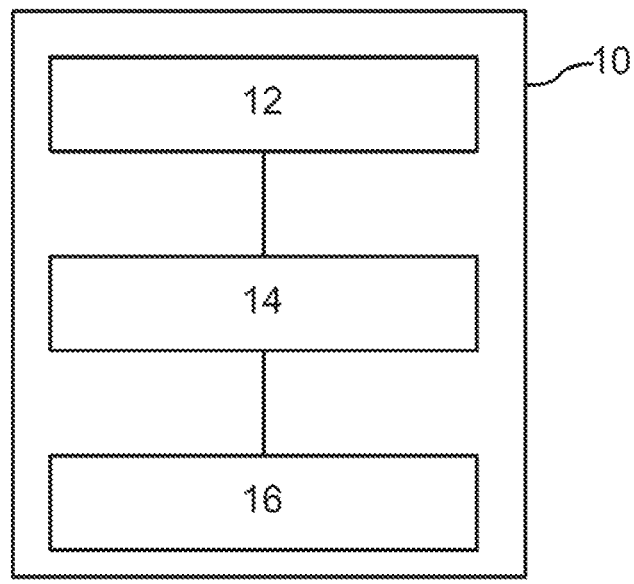
FIG. 1 is a schematic illustration of a virtual reality system including virtual reality glasses, a detection device for detecting the position of the virtual reality glasses and a control device for driving the virtual reality glasses.

A virtual reality system 10 is shown in a schematic illustration in FIG. 1. The virtual reality system 10 includes virtual reality glasses 12, a control device 14 for driving the virtual reality glasses 12, and also a detection device 16 for detecting the position of the virtual reality glasses 12.

Figure 2:
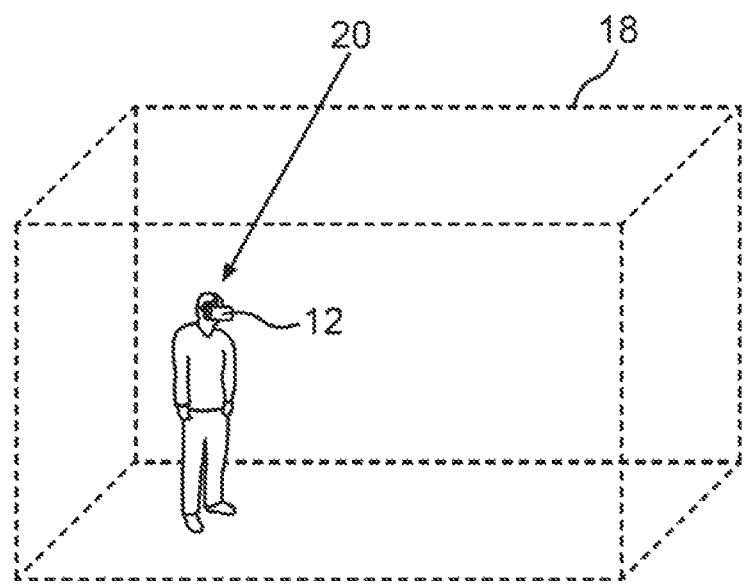
FIG. 2 is a schematic perspective view of a detection region in which a person having put on the virtual reality glasses is shown.

FIG. 2 shows detection region 18 in a schematic perspective view, wherein a person 20 having put on the virtual reality glasses 12 is situated in the detection region 18. As long as the person 20 is situated in the detection region 18, a position and orientation of the virtual reality glasses 12 can be reliably detected by using the detection device 16. On the basis of the detection of the position and orientation of the virtual reality glasses 12, it is possible also to deduce a position and orientation of the person 20. For example, taking account of the known position and orientation of the virtual reality glasses 12 it is possible to determine a position and orientation of the eyes of the person 20.

Figure 3:
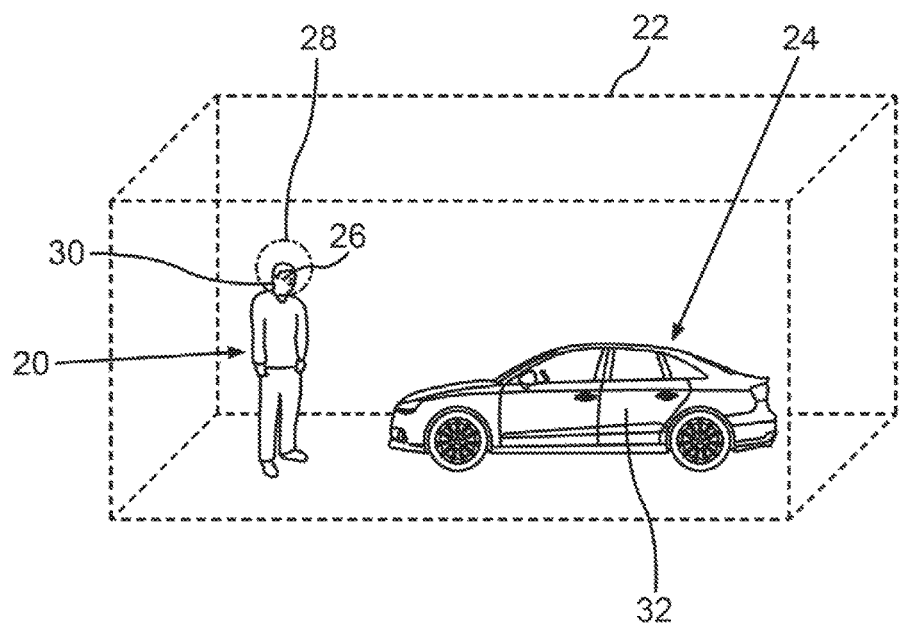
FIG. 3 is a schematic perspective view of a virtual environment which is displayed by using the virtual reality glasses and within which a virtual motor vehicle is arranged, wherein a virtual observation position of the person who has put on the virtual reality glasses is identified.

FIG. 3 shows a schematic perspective view of a virtual environment 22 within which a virtual motor vehicle 24 is arranged. The virtual environment 22 together with the virtual motor vehicle 24 is displayed by using the virtual reality glasses 12. The person 20 wearing the virtual reality glasses 12 is only illustrated in FIG. 3 in order to identify a virtual observation position 26 of the person 20, from which the person views the virtual environment 22 and the virtual motor vehicle 24 by using the virtual reality glasses 12. Thus, in accordance with the example illustration, the virtual motor vehicle 24 is represented to the person 20 obliquely from the front left precisely by using the virtual reality glasses 12.

The position and orientation of the virtual reality glasses 12 are determined continuously by using the detection device 16. Depending on the currently detected position of the virtual reality glasses 12, the control device 14 predefines the virtual observation position 26 from which the virtual reality glasses 12 display the virtual environment 23. Furthermore, the orientation of the virtual reality glasses 12 is also continuously detected by using the detection device 16. Depending on the detected orientation of the virtual reality glasses 12, the control device 14 continuously defines a virtual head orientation and hence also a kind of virtual viewing direction toward the virtual motor vehicle 24, in accordance with which the virtual reality glasses 12 display the virtual environment 22 and the virtual motor vehicle 24 arranged therein.

If the person 20 thus moves around within the detection region 18, then the person moves around virtually within the virtual environment 22 as well, as a result of which the person can walk around the displayed virtual motor vehicle 24, for example. If the person 20 pivots his/her head, then the person 20 within the virtual environment 22 likewise pivots his/her head, on account of which the person can also allow his/her gaze to wander virtually along the virtual motor vehicle 24.

The control device 14 furthermore predefines a virtual bounding volume 28, which surrounds the virtual observation position 26. In the exemplary embodiment shown in the example embodiment, the virtual bounding volume 28 is embodied as a sphere enclosing a virtual head 30 of the person 20 and thus also the virtual observation position 26, which corresponds as it were to the virtual eye position of the person 20 within the virtual environment 22. In this case, the spherical bounding volume 28 can be arranged for example concentrically around the virtual observation position 26 or else concentrically around the virtual head 30 of the person 20.

Contrary to the example illustration, it might be the case, for example, that a door 32 of the virtual motor vehicle 24 is swung open. If the person 20 within the virtual environment 22 then moves too close to the door 32 that has been swung open, it might happen that the person 20 within the virtual environment 22 collides with or passes through the door 32.

In order to make the person 20 aware in a timely manner that he/she is just about to collide with the door 32, it is provided that, as long as part of the virtual motor vehicle 24 is immersed in the virtual bounding volume 28, the part is displayed in an at least a partly transparent fashion. In the case of the door 32, this would mean that that part of the door 32 which is immersed in the bounding volume 28 is displayed in an at least partly transparent fashion. In this case, provision can be made, for example, for the part of the door 32 to be displayed all the more transparently the further it is immersed in the bounding volume 28. Alternatively, however, provision can also be made for the transparency of the part of the door 32 to be displayed in a manner increasing to an ever greater extent from a region intersecting a boundary of the bounding volume 28 to a region immersed the most deeply in the bounding volume 28. In other words, it is thus also possible, on the basis of the example of the door 32, for the part of the door 32 to be displayed more and more transparently the greater the extent to which it projects in the bounding volume 28.

Furthermore, it can be provided that, as soon as the part of the door 32 exceeds a predefined immersion depth in the bounding volume 28, the entire door 32 is completely masked out. As a result of the partly transparent display of that part of the door 32 which is immersed in the bounding volume 28, the person 20 is made aware in a timely manner that he/she is just about to collide with the door 32 of the virtual motor vehicle 24. At the latest when the entire door 32 is masked out on account of the door 32 being immersed too deeply in the bounding volume 28, the person 20 is given a very clear visual warning that he/she is just about to collide with the door 32.

The procedure explained on the basis of the example of the door 32 of the virtual motor vehicle 24 can be analogously applied to all other parts of the virtual motor vehicle 24.

In this case, the size, that is to say the dimensions of the bounding volume 28, is predefined differently depending on whether the person 20 sits within the virtual motor vehicle 24 or—as indicated in FIG. 3—looks at the virtual motor vehicle 24 in an exterior view. If the virtual motor vehicle 24 is displayed in an interior view by using the virtual reality glasses 12, the bounding volume 28 is predefined to be smaller than if the virtual motor vehicle 24 is displayed in an exterior view. This is because if the person 20 is sitting virtually in the virtual motor vehicle 24, then even small real movements of the person 20 may already be sufficient to collide with components of the virtual motor vehicle 24 such as, for example, a steering wheel, a dashboard or the like.

By contrast, if the person 20 is situated outside the virtual motor vehicle 24, then in comparison with a virtual interior view the person usually has a greater latitude of movement before he/she collides with components of the virtual motor vehicle 24. By using a corresponding adaptation of the size of the virtual bounding volume 28, this circumstance is taken into account, such that firstly, the person 20 is still made aware in a timely manner if he/she is just about to collide with a part of the virtual motor vehicle 24, and at the same time the realistic representation and perception of the virtual motor vehicle 24 is prevented from being diminished by components of the virtual motor vehicle 24 being switched to the partly transparent state too prematurely.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV,* 358 F3d 870, 69 USPQ2d 1865 (Fed. Cir. 2004).

The invention claimed is:

1. A method for operating a virtual reality system, the method comprising:
   detecting a position of virtual reality glasses worn by a user using a detection device;
   predefining a virtual observation position of the user based on the detected position of the virtual reality glasses;
   predefining a virtual bounding volume which at least partly surrounds the virtual observation position of the user; and
   displaying a virtual object disposed in a virtual environment, from the virtual observation position, by using the virtual reality glasses such that as long as a part of the virtual object is immersed in the virtual bounding volume, the part of the virtual object is displayed in an at least a partly transparent manner,
   a whole part of the virtual object immersed in the virtual bounding volume being displayed in an increasingly transparent manner the further the part of the virtual object is immersed in the virtual bounding volume, or
   the part of the virtual object immersed in the virtual bounding volume being displayed in an increasingly transparent manner from a region intersecting a boundary of the virtual bounding volume to an innermost region of the virtual bounding volume,
   wherein predefining the virtual bounding volume which at least partly surrounds the virtual observation position comprises:
      predefining the virtual bounding volume to be a first size when the user wearing the virtual reality glasses observes the virtual object from an interior viewpoint of the virtual object, and
      predefining the virtual bounding volume to be a second size, larger than the first size, when the user wearing the virtual reality glasses observes the virtual object from an exterior viewpoint of the virtual object.

2. The method as claimed in claim 1, wherein
   the virtual bounding volume is predefined in a spherical shape, and
   a midpoint of the virtual bounding volume corresponds to the virtual observation position.

3. The method as claimed in claim 1, wherein the displaying comprises completely masking out a component or an assembly to which the part of the virtual object belongs as soon as the part of the virtual object exceeds a predefined immersion depth in the bounding volume.

4. The method as claimed in claim 1, wherein the virtual object corresponds to a virtual motor vehicle.

5. The method as claimed in claim 1, wherein
   the virtual object is a virtual motor vehicle,
   the user wearing the virtual reality glasses observes the virtual motor vehicle from the interior viewpoint of the virtual motor vehicle when sitting in the virtual motor vehicle, and
   the user wearing the virtual reality glasses observes the virtual motor vehicle from the exterior viewpoint of the virtual motor vehicle when outside of the virtual motor vehicle.

6. A virtual reality system, comprising:
   virtual reality glasses;
   a detection device configured to detect a position of the virtual reality glasses when the virtual reality glasses are worn by a user; and
   a controller, comprising a processor, configured:
      to predefine a virtual observation position based on the detected position of the virtual reality glasses worn by the user,
      to predefine a virtual bounding volume which at least partly surrounds the virtual observation position of the user, and
      to drive the virtual reality glasses to display a virtual object disposed in a virtual environment from the virtual observation position, such that, as long as a part of the virtual object is immersed in the virtual bounding volume, the part of the virtual object is displayed in at least a partly transparent manner, a whole part of the virtual object immersed in the virtual bounding volume being displayed in an increasingly transparent manner the further the part of the virtual object is immersed in the virtual bounding volume, or the part of the virtual object immersed in the virtual bounding volume being displayed in an increasingly transparent manner from a region intersecting a boundary of the virtual bounding volume to an innermost region of the virtual bounding volume,
   wherein
   the controller is to predefine the virtual bounding volume to be a first size when the user wearing the virtual reality glasses observes the virtual object from an interior viewpoint of the virtual object, and
   the controller is to predefine the virtual bounding volume to be a second size, larger than the first size, when the user wearing the virtual reality glasses observes the virtual object from an exterior viewpoint of the virtual object.

7. The virtual reality system as claimed in claim 6, wherein
   the controller predefines the virtual bounding volume in a spherical shape, and a midpoint of the virtual bounding volume corresponds to the virtual observation position.

8. The virtual reality system as claimed in claim 6, wherein the controller drives the virtual reality glasses to display the virtual object by completely masking out a component or an assembly to which the part of the virtual object belongs as soon as the part of the virtual object exceeds a predefined immersion depth in the bounding volume.

9. The virtual reality system as claimed in claim 6, wherein the virtual object corresponds to a virtual motor vehicle.

10. The virtual reality system as claimed in claim 6, wherein
- the virtual object is a virtual motor vehicle,
- the user wearing the virtual reality glasses observes the virtual motor vehicle from the interior viewpoint of the virtual motor vehicle when sitting in the virtual motor vehicle, and
- the user wearing the virtual reality glasses observes the virtual motor vehicle from the exterior viewpoint of the virtual motor vehicle when outside of the virtual motor vehicle.

11. The virtual reality system as claimed in claim 6, wherein the controller drives the virtual reality glasses such that the transparency increases linearly the further the part of the virtual object is immersed in the virtual bounding volume.

12. The virtual reality system as claimed in claim 6, wherein
- the virtual object is a virtual motor vehicle, and
- the part of the virtual motor vehicle is a door.

\* \* \* \* \*